United States Patent
Iwamoto et al.

(10) Patent No.: US 11,813,732 B2
(45) Date of Patent: Nov. 14, 2023

(54) DELIVERY MANAGEMENT SYSTEM, DELIVERY MANAGEMENT METHOD, AND DELIVERY MANAGEMENT PROGRAM

(71) Applicant: Toyota Jidosha Kabushiki Kaisha, Toyota (JP)

(72) Inventors: Kunihiro Iwamoto, Nagakute (JP); Yuta Itozawa, Nagoya (JP); Hirotaka Komura, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 17/313,431

(22) Filed: May 6, 2021

(65) Prior Publication Data

US 2021/0354294 A1 Nov. 18, 2021

(30) Foreign Application Priority Data

May 15, 2020 (JP) ................................. 2020-085760

(51) Int. Cl.
*B25J 9/16* (2006.01)

(52) U.S. Cl.
CPC ........... *B25J 9/1653* (2013.01); *B25J 9/1661* (2013.01); *B25J 9/1679* (2013.01)

(58) Field of Classification Search
CPC ...... B25J 9/1653; B25J 9/1661; B25J 9/1679; G06Q 50/28; G06Q 10/0832; G06Q 10/083; G06Q 10/087; G06Q 30/0635
See application file for complete search history.

(56) References Cited

U.S. PATENT DOCUMENTS

| | | | |
|---|---|---|---|
| 10,216,188 B2* | 2/2019 | Brady | G05D 1/0088 |
| 11,231,706 B1* | 1/2022 | Curlander | B25J 5/005 |
| 2018/0059635 A1* | 3/2018 | Johnson | B25J 5/007 |
| 2019/0256096 A1* | 8/2019 | Graf | G08G 1/0129 |
| 2020/0023765 A1* | 1/2020 | Lee | B60P 3/007 |

FOREIGN PATENT DOCUMENTS

| | | |
|---|---|---|
| JP | 2004-231357 A | 8/2004 |
| JP | 2016-45665 A | 4/2016 |
| JP | 2019-003365 A | 1/2019 |
| JP | 2019-109847 A | 7/2019 |
| WO | 2019/143554 A1 | 7/2019 |

\* cited by examiner

*Primary Examiner* — Abby Y Lin
*Assistant Examiner* — Dylan M Katz
(74) *Attorney, Agent, or Firm* — Dinsmore & Shohl LLP

(57) ABSTRACT

The delivery management system stores identification information identifying an article to be delivered to a user and storage place information indicating a storage place of the article in a living space of the user while associating the identification information and the storage place information with each other, and reads the identification information attached to the article and extracts the storage place information associated with the identification information when the article arrives at a delivery destination.

7 Claims, 4 Drawing Sheets

DELIVERY MANAGEMENT SYSTEM, DELIVERY MANAGEMENT METHOD, AND DELIVERY MANAGEMENT PROGRAM

CROSS REFERENCE TO RELATED APPLICATIONS

This application is based upon and claims the benefit of priority from Japanese patent application No. 2020-085760, filed on May 15, 2020, the disclosure of which is incorporated herein in its entirety by reference.

BACKGROUND

The present disclosure relates to a delivery management system, a delivery management method, and a delivery management program.

Japanese Unexamined Patent Application Publication No. 2016-45665 discloses a system for automatically delivering articles to storage compartments (e.g., storage lockers) partitioned into a plurality of storage spaces.

SUMMARY

In the system disclosed in Japanese Unexamined Patent Application Publication No. 2016-45665, a recipient of a delivered article cannot know where an article is stored. Further, in the case where a robot receives a delivered article and stores the received article in a predetermined place in a living space, the robot needs to have information about the storage place of the article.

The present disclosure has been made in view of the above-described circumstances, and provides a delivery management system and a delivery management method capable of obtaining information about a storage place of a delivered article.

A first exemplary aspect is a delivery management system configured to manage deliveries of articles by using a computer, the delivery management system being further configured to:
  store identification information identifying an article to be delivered to a user and storage place information indicating a storage place of the article in a living space of the user while associating the identification information and the storage place information with each other; and
  read the identification information attached to the article and extract the storage place information associated with the identification information when the article arrives at a delivery destination.

Further, another exemplary aspect is a delivery management method for managing deliveries of articles by using a computer, the delivery management method including:
  storing identification information identifying an article to be delivered to a user and storage place information indicating a storage place of the article in a living space of the user while associating the identification information and the storage place information with each other; and
  reading the identification information attached to the article and extracting the storage place information associated with the identification information when the article arrives at a delivery destination.

Further, another exemplary aspect is a delivery management program for managing deliveries of articles, the delivery management program being adapted to cause a computer to:
  store identification information identifying an article to be delivered to a user and storage place information indicating a storage place of the article in a living space of the user while associating the identification information and the storage place information with each other; and
  read the identification information attached to the article and extract the storage place information associated with the identification information when the article arrives at a delivery destination.

As described above, in an aspect of the present disclosure, identification information identifying an article to be delivered to a user and storage place information indicating a storage place of the article in a living space of the user are stored while being associated with each other. Further, the identification information attached to the article is read and the storage place information associated with the identification information is extracted when the article arrives at a delivery destination. Therefore, when the article arrives at the delivery destination, it is possible to obtain the storage place information of the article and store the article in a predetermined storage place based on the storage place information.

A storage robot capable of moving in the living space may store the identification information and the storage place information while associating the identification information and the storage place information with each other. Further, when the article arrives at the delivery destination, the storage robot may extract the storage place information associated with the identification information and store the article in the storage place based on the storage place information. By the above-described configuration, the article can be stored by the storage robot.

When the article arrives at the delivery destination, the storage robot may read the identification information attached to the article and extract the storage place information associated with the identification information. By the above-described configuration, the storage place information can be immediately extracted when the article arrives at the delivery destination.

Only the storage robot may store the storage place information. By the above-described configuration, a risk that personal information could be leaked onto the Internet can be reduced.

The storage robot may erase the stored storage place information after storing the article in the storage place. By the above-described configuration, the leakage of personal information can be prevented.

The storage robot may store, in addition to the storage place information, handling information of the article while associating the handling information with the identification information. Further, when the article arrives at the delivery destination, the storage robot may extract the handling information associated with the identification information and store the article based on the handling information. By the above-described configuration, the delivered article can be appropriately handled.

According to the present disclosure, it is possible to provide a delivery management system and a delivery management method capable of obtaining information about a storage place of a delivered article.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
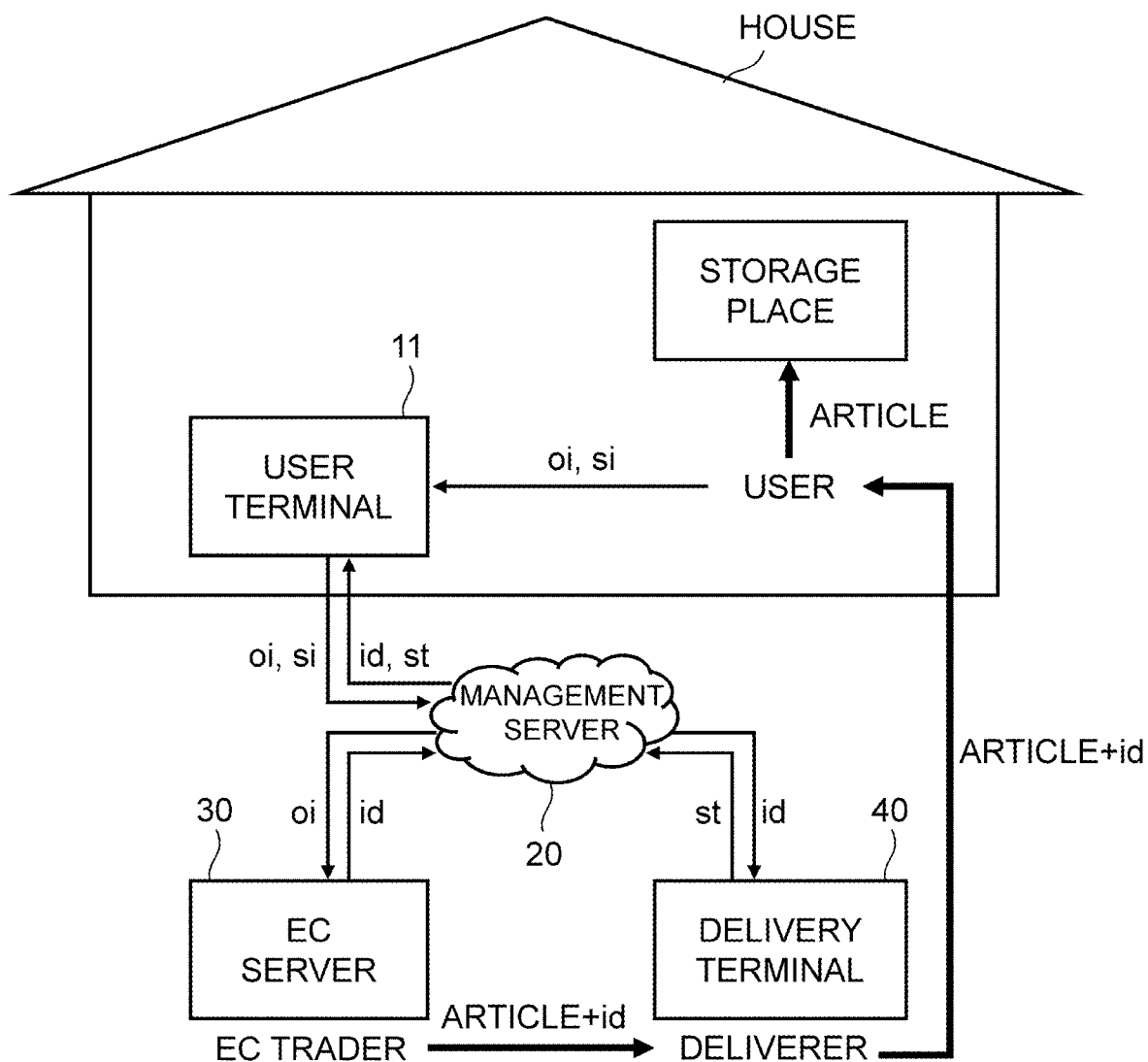
FIG. 1 is a block diagram of a delivery management system according to a first embodiment.

Specific embodiments will be described hereinafter in detail with reference to the drawings. The same or corresponding elements are denoted by the same reference numerals or symbols throughout the drawings, and redundant descriptions thereof are omitted as appropriate for clarifying the descriptions.

First Embodiment

Firstly, a delivery management system and a delivery management method according to a first embodiment will be described with reference to FIG. 1. FIG. 1 is a block diagram of the delivery management system according to the first embodiment. The delivery management system is a delivery management system for managing deliveries of articles by using a computer. As shown in FIG. 1, the delivery management system according to this embodiment includes a user terminal 11, a management server 20, an EC (Electronic Commerce) server 30, and a delivery terminal 40.

Each of the user terminal 11, the management server 20, the EC server 30, and the delivery terminal 40 includes, for example, an arithmetic unit such as a CPU (Central Processing Unit), and a storage unit such as a RAM (Random Access Memory) and a ROM (Read Only Memory) in which various control programs, data, and the like are stored. That is, each of the user terminal 11, the management server 20, the EC server 30, and the delivery terminal 40 has functions as a computer, and performs the below-described processes based on the aforementioned various control programs and the like.

As shown in FIG. 1, the user terminal 11 is a communication terminal that is connected to the management server 20 through a cable or wirelessly so that the user terminal 11 can communicate with the management server 20. The user terminal 11 is not limited to any particular terminal as long as it can communicate with the management server 20. For example, the user terminal 11 may be a mobile communication terminal such as a smartphone or a tablet-type terminal, or a PC (Personal Computer) installed indoors. Note that although the user terminal 11 is located in a living space of a house in FIG. 1, the user terminal 11 may be located outside the living space in the house, or outside the house. Further, in this specification, the meaning of the term "living space" includes an office space.

As shown in FIG. 1, a user enters order information oi and storage information si into the user terminal 11. The order information oi and the storage information si are transmitted from the user terminal 11 to the management server 20. The order information oi is information about an article to be delivered, and includes, for example, information about a commodity name, a quantity, a desired delivery date, a delivery destination, etc. The storage information si includes at least storage place information.

Note that, in this embodiment, the storage information si may be stored only in the user terminal 11 and may not be transmitted to the management server 20.

The storage place information is information indicating the storage place of the article in the living space of the user. The storage place information indicates, for example, a room in which the article is stored. More specifically, the storage place information may indicate storage furniture such as a refrigerator, a freezer, various shelves, a chest, a closet, and a storage box. Note that, in this specification, the storage furniture includes electric appliances capable of storing an article, such as a refrigerator and a freezer. Still more specifically, the storage place information may indicate a specific storage place in a refrigerator, a freezer, various shelves, a chest, a closet, a storage box, and the like. The storage place information is stored as, for example, 3D (three-dimensional) data or annotation data.

The management server 20 is a server that manages the delivery management system. As shown in FIG. 1, the management server 20 is connected to the user terminal 11, the EC server 30, and the delivery terminal 40 so that the management server 20 can communicate with these apparatuses. The management server 20 is, for example, a cloud server. The management server 20 transmits order information oi received from the user terminal 11 to the EC server 30. In the example shown in FIG. 1, the management server 20 does not transmit storage information si that possibly includes personal information of a user to the EC server 30 and the delivery terminal 40.

Further, when the delivery of the article has been completed, the management server 20 may erase the stored storage information si of the article.

Further, the management server 20 also receives order identification information id issued by the EC server 30 and transmits the received order identification information id to the user terminal 11 and the delivery terminal 40. The order identification information id is information identifying the article to be delivered, and is, for example, an order number thereof. Further, the management server 20 receives status information st indicating the delivery status of the article from the delivery terminal 40 and transmits the received status information st to the user terminal 11. The status information st includes, for example, information such as "Waiting to be delivered", "In-delivering" or "Delivered" as the delivery status of the article.

The EC server 30 is, for example, a server constituting an EC site on the Internet managed by an EC trader. As shown in FIG. 1, the EC server 30, which is connected to the management server 20 so as to be able to communicate with the management server 20, issues order identification information id according to the order information of received from the management server 20 and transmits the issued order identification information id to the management server 20.

The delivery terminal 40 is, for example, a terminal carried by a deliverer (i.e., a person or the like who delivers the article) and is a communication terminal capable of reading the order identification information id attached to the article. As shown in FIG. 1, the delivery terminal 40 is connected to the management server 20 so as to be able to communicate with the management server 20. The delivery terminal 40 receives the order identification information id from the management server 20 and transmits status information st indicating the delivery status of the article to the management server 20.

Note that the delivery terminal 40 may be a delivery robot, and this delivery robot may deliver the article on behalf of the deliverer.

The order identification information id is, for example, text (i.e., letters), a symbol, a bar code, a 2D (two-dimensional) code, a FRID (Radio Frequency IDentifier), or the like, and is directly or indirectly attached to the article. More specifically, the order identification information id is directly stuck on the article or embedded in the article. Alternatively, the order identification information id may be stuck on or embedded in the package of the article, and may be indirectly attached to the article. Note that the package is not limited to any particular packages, and may be, for example, a box, a bag, or a sheet made of paper or vinyl. The package may be a disposable type, or may be a reusable type such as a returnable box.

Note that as shown in FIG. 1, the article with the order identification information id attached thereto is delivered from the EC trader to the user by the deliverer. For example, the status information st, which indicates the delivery status of the article, is "Waiting to be delivered" in a period from when the delivery terminal 40 receives the order identification information id to when the deliverer receives the article from the EC trader. When the deliverer receives the article from the EC trader and reads the order identification information id attached to the article by using the delivery terminal 40, the status information st changes to "In-delivering". When the deliverer has delivered the article to the user (i.e., when the delivery of the article has been completed) and the order identification information id attached to the article is read again by the delivery terminal 40, the status information st changes to "Delivered".

As described above, the status information st indicating the delivery status of the article is transmitted from the delivery terminal 40 to the user terminal 11 through the management server 20. When the delivery of the article has been completed, the status information st changes to "Delivered" upon reading the order identification information id attached to the article. The user terminal 11 extracts the storage information si, which has been stored while being associated with the order identification information id, in response to the change of the status information st to "Delivered". Then, the user terminal 11 notifies the user of the storage information si (including the storage place information). For example, the user terminal 11 displays the storage place in the form of text, a figure, an image or the like, or notifies the user of the storage place by a voice (e.g., a voice message). As a result, the user can recognize the storage place of the delivered article.

Note that when the delivery of the article has been completed, the user does not necessarily have to receive the article. That is, the only requirement is that the article should arrive at the house. For example, the article may be placed in a predetermined place (e.g., a delivery box or the like) in the house. Alternatively, a robot may receive the article (which will be described later in detail).

Further, the status information st may also be transmitted to the EC server 30.

As described above, in the delivery management system according to this embodiment, the order identification information id for identifying the article to be delivered to the user and the storage information si including information about the storage place of the article in the living space of the user are stored in the user terminal 11 while being associated with each other. Then, when the article has arrived at the delivery destination, the order identification information id attached to the article is read by the delivery terminal 40 and the storage information si associated with this order identification information id is extracted in the user terminal 11.

Specifically, when the article has arrived at the delivery destination and the order identification information id attached to the article is read by the delivery terminal 40, the status information st indicating the delivery status of the article changes. By using this change as a trigger, the user terminal 11 extracts the storage information si associated with the order identification information id and notifies the user of the storage information si. As a result, the user can recognize the storage information si, which was entered to the user terminal 11 in advance when he/she ordered the article, and can store the delivered article based on this storage information si without a hitch.

Second Embodiment

Figure 2:
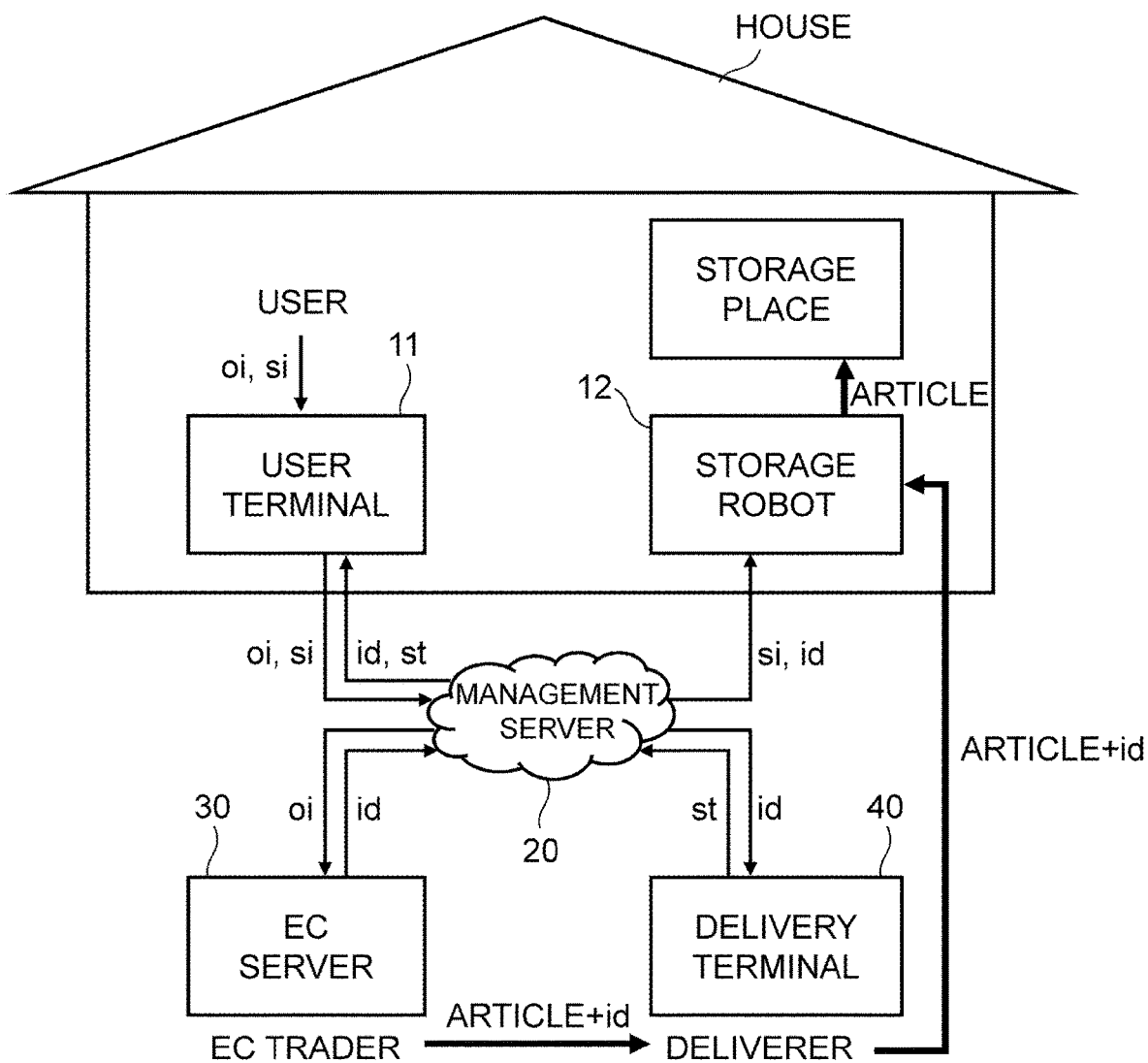
FIG. 2 is a block diagram of a delivery management system according to a second embodiment.

Next, a delivery management system and a delivery management method according to a second embodiment will be described with reference to FIG. 2. FIG. 2 is a block diagram of the delivery management system according to the second embodiment.

As shown in FIG. 2, the delivery management system according to this embodiment includes a storage robot 12 in addition to the user terminal 11, the management server 20, the EC server 30, and the delivery terminal 40 shown in FIG. 1. The storage robot 12 also includes, for example, an arithmetic unit and a storage unit in which various control programs, data, and the like are stored, has functions as a computer, and performs the below-described processes based on the various control programs.

As shown in FIG. 2, the management server 20 transmits storage information si received from the user terminal 11 to the storage robot 12. Further, the management server 20 receives order identification information id issued by the EC server 30, and transmits the received order identification information id to the storage robot 12 as well as to the user terminal 11 and the delivery terminal 40.

In this embodiment, the storage information si may include handling information for the delivered article in addition to the storage place information. The handling information includes, for example, information about a temperature at which the article should be stored, a force with which the article should be grasped, a direction in which the article should be grasped, whether the article should be privately handled, a condition(s) for opening the article, and the like.

The storage robot 12 can move in the living space and stores the delivered article in a predetermined storage place. The storage robot 12 includes, for example, an arm(s) for grasping the article. As shown in FIG. 2, the storage robot 12 is connected to the management server 20 so as to be able to communicate with the management server 20. The storage robot 12 receives the storage information si and the order identification information id from the management server 20, and stores the received storage information si and the order identification information id while associating the storage information si and the order identification information id with each other. Then, when the article has arrived at the delivery destination, the storage robot 12 reads the order identification information id attached to the article and extracts the storage information si associated with the order identification information id.

As described above, in the delivery management system according to this embodiment, the order identification information id for identifying the article to be delivered to the user and the storage information si including information about the storage place of the article in the living space of the user are stored in the storage robot 12 while being associated with each other. Then, when the article has arrived at the delivery destination, the storage robot 12 reads the order identification information id attached to the article and extracts the storage information si associated with this order identification information id. Therefore, when the article has arrived at the delivery destination, the storage robot 12 can immediately obtain the storage information si of the article, and can store the article in a predetermined storage place based on the obtained storage information si.

The storage robot 12 may erase the stored storage information si of the article after storing the article in the predetermined storage place. The leakage of personal information can be prevented.

Note that when the article has arrived at the delivery destination, the order identification information id attached to the article may be read by the delivery terminal 40 instead of being read by the storage robot 12. In such a case, the storage robot 12 receives the status information st indicating the delivery status of the article from the management server 20. Then, when the delivery of the article has been completed, the order identification information id attached to the article is read and the status information st changes to "Delivered". Further, by using this change of the status information st as a trigger, the storage robot 12 can extract the storage information si, which has been stored while being associated with the order identification information id.

Further, the storage robot 12 may receive, in addition to the storage information si, the order information oi from the management server 20. By receiving the status information st and the order information oi before the article is delivered, the storage robot 12 can make a preparation such as securing the storage place of the articles.

Further, the storage robot 12 may store the delivered article based on the handling information included in the storage information si. The storage robot 12 can appropriately handle the delivered article based on the handling information. As described above, the handling information includes, for example, information about a temperature at which the article should be stored, a force with which the article should be grasped, a direction in which the article should be grasped, whether the article should be privately handled, a condition(s) for opening the article, and the like.

For example, the storage robot 12 compares information about the temperature at which the article should be stored with the temperature at the storage place, and when the temperature at the storage place is not suitable, the storage robot 12 transmits, for example, an alert to the user terminal 11. Alternatively, the storage robot 12 may display an alert on a display screen, or may deliver an alert in the form of a sound or a voice.

Further, the storage robot 12 can grasp the article based on the information about the force with which the article should be grasped so that the article is not deformed or broken.

Further, the storage robot 12 can grasp the article based on the information about the direction in which the article should be grasped so that the article is appropriately conveyed and stored.

Further, when the article should be "privately" handled, the storage robot 12 stores the article so that any person other than the user cannot see the article.

Further, the storage robot 12 stores the article in a packaged state or in an opened state based on the information about the condition(s) for opening the article. The degree of opening may also be specified in a more detailed manner. For example, conditions that the article should be removed from the packaging box but the packaging paper of the article should not be opened are specified. Alternatively, conditions that the article should be removed from the packaging box and the packaging paper of the article should also be opened are specified.

The rest of the configuration is similar to that of the first embodiment, and therefore the description thereof is omitted.

Third Embodiment

Figure 3:
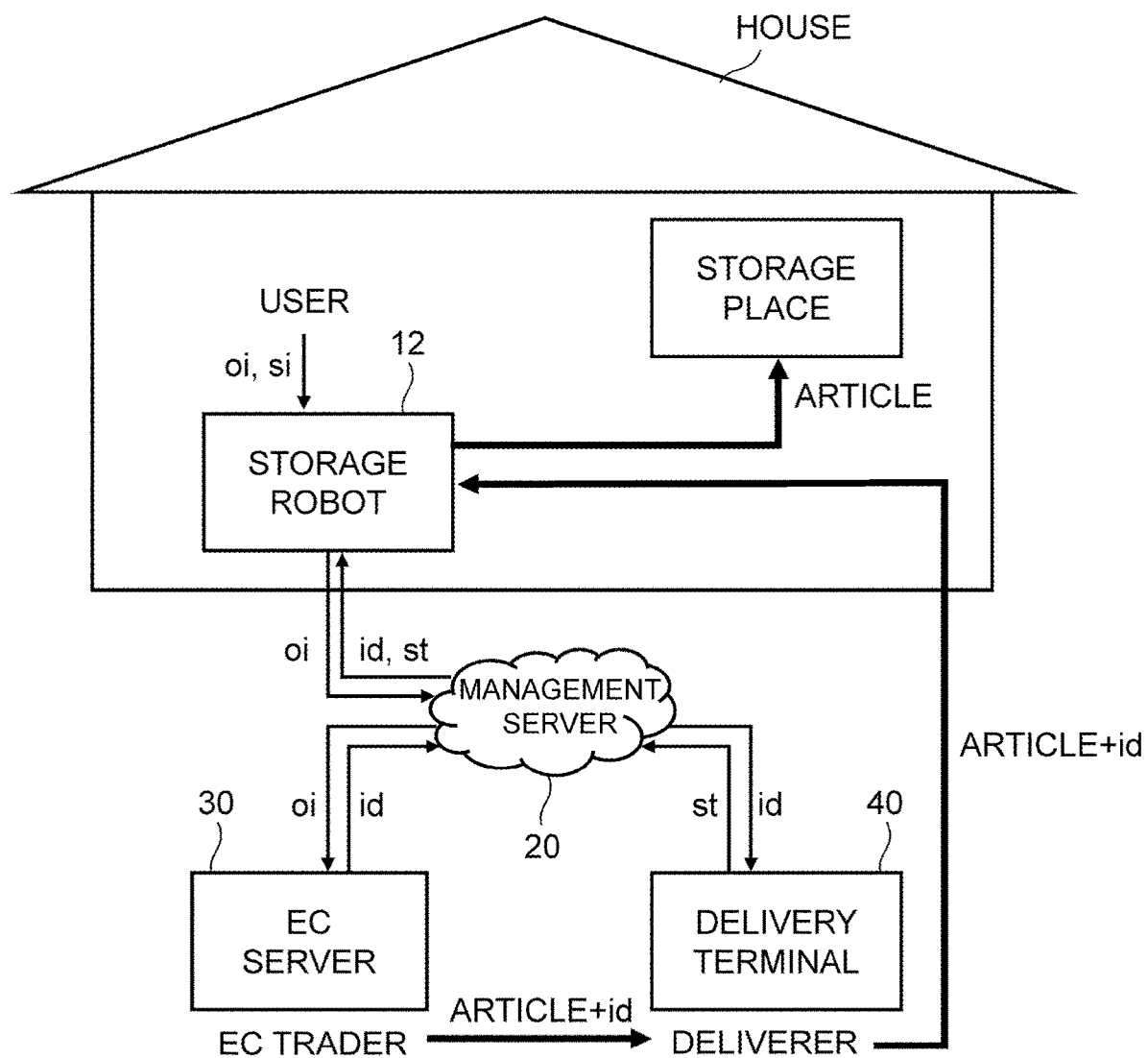
FIG. 3 is a block diagram of a delivery management system according to a third embodiment.

Next, a delivery management system and a delivery management method according to a third embodiment will be described with reference to FIG. 3. FIG. 3 is a block diagram of the delivery management system according to the third embodiment.

As shown in FIG. 3, in the delivery management system according to this embodiment, the storage robot 12 also functions as the user terminal 11 shown in FIG. 2.

As shown in FIG. 3, a user enters order information oi and storage information si into the storage robot 12. The order information oi is transmitted from the storage robot 12 to the management server 20. Meanwhile, the storage information si is stored only in the storage robot 12 and is not transmitted to the management server 20.

As described above, in this embodiment, since the article is ordered through the storage robot 12, the storage information si is directly input to the storage robot 12 and stored therein. Therefore, there is no need to transmit the storage information si, which possibly includes personal information of the user, even to the management server 20, so that the risk that the personal information could be leaked onto the Internet can be reduced.

As shown in FIG. 3, the management server 20 receives order identification information id issued by the EC server 30 and transmits the received order identification information id to the storage robot 12 and the delivery terminal 40. Further, the management server 20 receives status information st indicating the delivery status of the article from the delivery terminal 40 and transmits the received status information st to the storage robot 12.

As shown in FIG. 3, the storage robot 12 stores the storage information si entered by the user and the order identification information id received from the management server 20 while associating the storage information si and the order identification information id with each other. Then, when the article has arrived at the delivery destination, the storage robot 12 reads the order identification information id attached to the article and extracts the storage information si associated with this order identification information id.

As described above, in the delivery management system according to this embodiment, the order identification information id for identifying the article to be delivered to the user and the storage information si including information about the storage place of the article in the living space of the user are stored in the storage robot 12 while being associated with each other. Then, when the article has arrived at the delivery destination, the storage robot 12 reads the order identification information id attached to the article and extracts the storage information si associated with this order identification information id. Therefore, when the article has arrived at the delivery destination, the storage robot 12 can obtain the storage information si of the article, and can store the article in a predetermined storage place based on the obtained storage information si.

Note that when the article has arrived at the delivery destination, the order identification information id attached to the article may be read by the delivery terminal 40 instead of being read by the storage robot 12. In this embodiment, the storage robot 12 receives the status information st indicating the delivery status of the article from the management server 20. Therefore, when the delivery of the article has been completed, the order identification information id attached to the article is read and the status information st changes to "Delivered". Further, by using this change of the status information st as a trigger, the storage robot 12 can extract the storage information si, which has been stored while being associated with the order identification information id.

The rest of the configuration is similar to that of the second embodiment, and therefore the description thereof is omitted.

Fourth Embodiment

Figure 4:
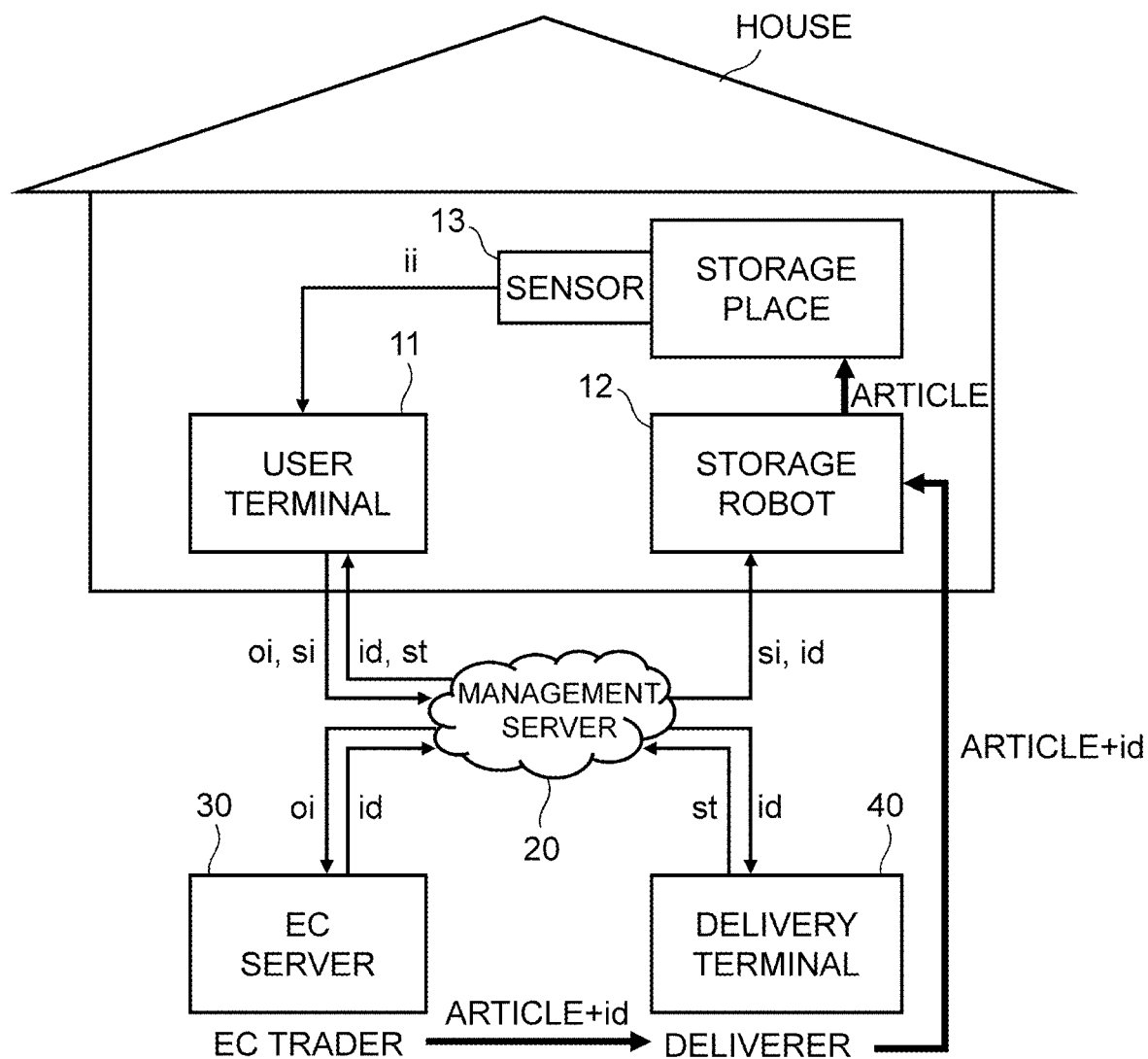
FIG. 4 is a block diagram of a delivery management system according to a fourth embodiment.

Next, a delivery management system and a delivery management method according to a fourth embodiment will be described with reference to FIG. 4. FIG. 4 is a block diagram of the delivery management system according to the fourth embodiment.

As shown in FIG. 4, the delivery management system according to this embodiment includes a sensor 13 in addition to the user terminal 11, the storage robot 12, the management server 20, the EC server 30, and the delivery terminal 40 shown in FIG. 2.

The sensor 13 detects an inventory status of articles in the storage place, and transmits inventory information ii to the user terminal 11. That is, in the delivery management system according to this embodiment, a user does not enter order information oi and storage information si into the user terminal 11, and the sensor 13 instead detects an inventory status without requiring any intervention of the user and automatically transmits inventory information ii to the user terminal 11.

When the user terminal 11 determines that, for example, the number of stocked articles decreases below a predetermined reference value based on the inventory information ii received from the sensor 13, it generates order information oi and storage information si, and transmits the generated order information oi and the storage information si to the management server 20. For example, a plurality of sensors 13 are provided for a plurality of storage places of various articles, respectively, and the user terminal 11 can determine a commodity name, a quantity, and the like of articles to be ordered based on the inventory information ii received from the sensor 13.

This embodiment is suitable for inventory management of articles that are ordered more than once, i.e., are repeatedly ordered.

As shown in FIG. 4, the storage robot 12 stores the storage information si and the order identification information id received from the management server 20 while associating the storage information si and the order identification information id with each other. Then, when the article has arrived at the delivery destination, the storage robot 12 reads the order identification information id attached to the article and extracts the storage information si associated with the order identification information id.

As described above, in the delivery management system according to this embodiment, the order identification information id for identifying the article to be delivered to the user and the storage information si including information about the storage place of the article in the living space of the user are stored in the storage robot 12 while being associated with each other. Then, when the article has arrived at the delivery destination, the storage robot 12 reads the order identification information id attached to the article and extracts the storage information si associated with this order identification information id. Therefore, when the article has arrived at the delivery destination, the storage robot 12 can obtain the storage information si of the article, and can store the article in a predetermined storage place based on the obtained storage information si.

The rest of the configuration is similar to that of the second embodiment, and therefore the description thereof is omitted. Further, the third embodiment may be combined with this embodiment.

In the above-described examples, the various control programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). Further, the program may be provided to a computer using any type of transitory computer readable media. Examples of transitory computer readable media include electric signals, optical signals, and electromagnetic waves. Transitory computer readable media can provide the program to a computer through a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery management system configured to manage deliveries of articles by using a computer, the delivery management system comprising a storage robot capable of moving in a living space of a user configured to:
    store identification information identifying an article to be delivered to the user and storage place information indicating a storage place of the article in the living space of the user while associating the identification information and the storage place information with each other; and
    when the article arrives at the delivery destination, read the identification information attached to the article, extract the storage place information associated with the identification information, and store the article in the storage place based on the storage place information,
    wherein only the storage robot stores the storage place information.

2. The delivery management system according to claim 1, wherein the storage robot erases the stored storage place information after storing the article in the storage place.

3. The delivery management system according to claim 1, wherein the storage robot stores, in addition to the storage place information, handling information of the article while associating the handling information with the identification information, and when the article arrives at the delivery destination, the storage robot extracts the handling information associated with the identification information and stores the article based on the handling information.

4. A delivery management method for managing deliveries of articles by using a computer, the delivery management method comprising:

storing, by a storage robot capable of moving in the living space, identification information identifying an article to be delivered to a user and storage place information indicating a storage place of the article in a living space of the user while associating the identification information and the storage place information with each other; and when the article arrives at the delivery destination, reading, by the storage robot, the identification information attached to the article, extracting, by the storage robot, the storage place information associated with the identification information, and storing, by the storage robot, the article in the storage place based on the storage place information, wherein only the storage robot stores the storage place information.

5. The delivery management method according to claim 4, wherein the storage robot erases the stored storage place information after storing the article in the storage place.

6. The delivery management method according to claim 4, wherein the storage robot stores, in addition to the storage place information, handling information of the article while associating the handling information with the identification information, and when the article arrives at the delivery destination, the storage robot extracts the handling information associated with the identification information and stores the article based on the handling information.

7. A non-transitory computer readable medium storing a delivery management program for managing deliveries of articles, the delivery management program being adapted to cause a storage robot capable of moving in a living space of a user to:

store identification information identifying an article to be delivered to the user and storage place information indicating a storage place of the article in the living space of the user while associating the identification information and the storage place information with each other; and when the article arrives at the delivery destination, read the identification information attached to the article, extract the storage place information associated with the identification information, and store the article in the storage place based on the storage place information, wherein only the storage robot stores the storage place information.

\* \* \* \* \*